Dec. 6, 1927.
E. G. McDONALD
1,652,035
BRAKE SHOE
Filed June 25, 1926
2 Sheets-Sheet 1
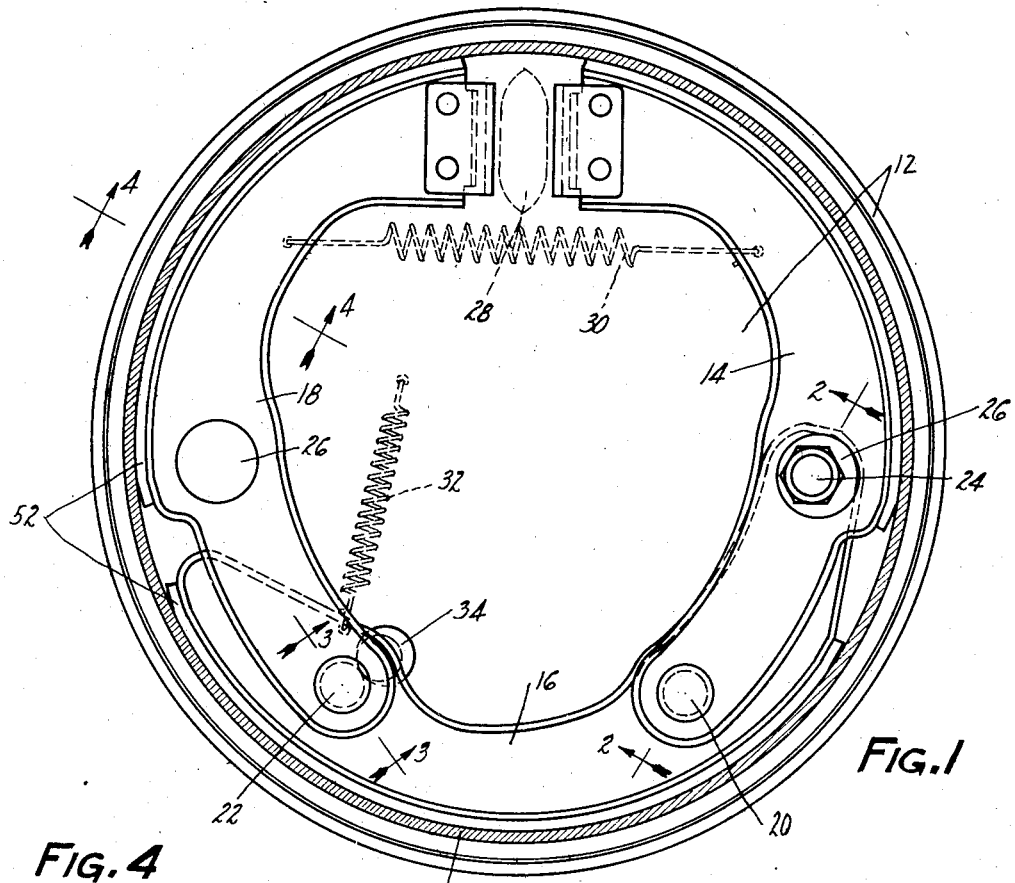
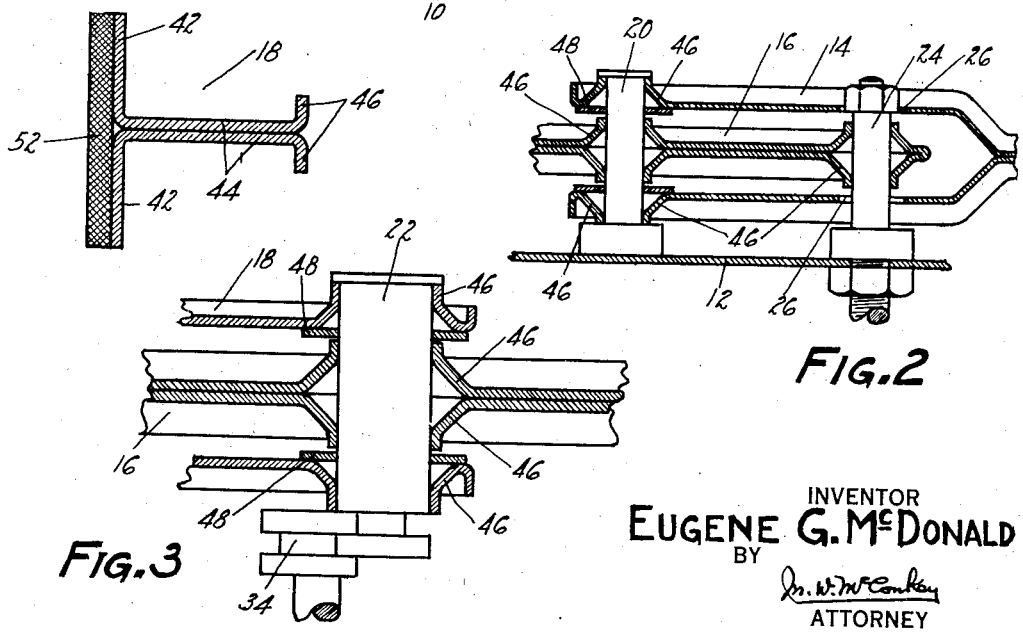
INVENTOR
EUGENE G. McDONALD
BY
M. W. McConkey
ATTORNEY Dec. 6, 1927.
E. G. McDONALD
1,652,035
BRAKE SHOE
Filed June 25, 1926
2 Sheets-Sheet 2
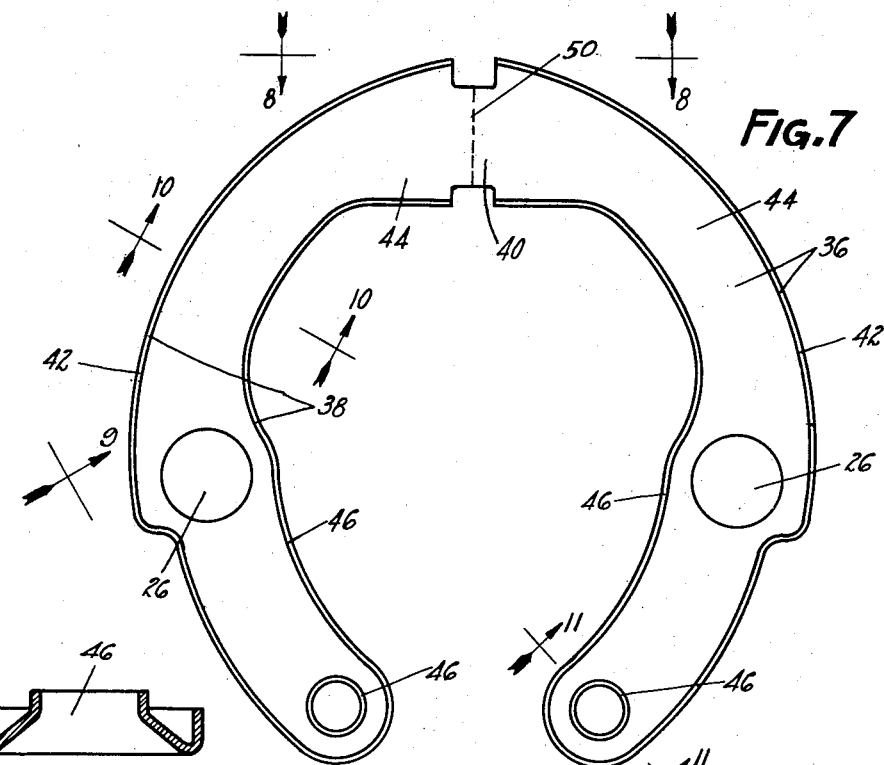
FIG.7
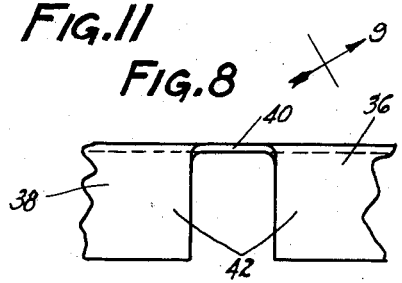
FIG.11
FIG.8
FIG.9
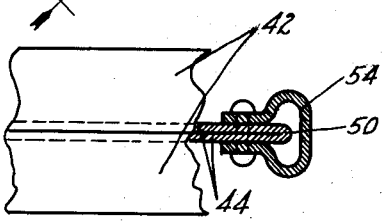
FIG.5
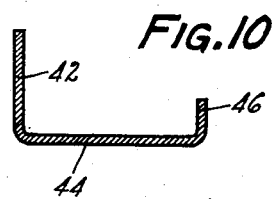
FIG.10
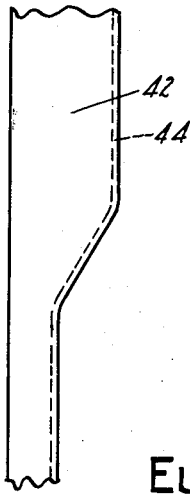
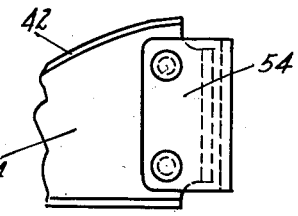
FIG.6
FIG.12
INVENTOR
EUGENE G. McDONALD
BY
ATTORNEY Patented Dec. 6, 1927.

1,652,035

UNITED STATES PATENT OFFICE.

EUGENE G. McDONALD, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed June 25, 1926. Serial No. 118,407.

This invention relates to brakes, and is illustrated as embodied in a pressed metal brake shoe for an internal expanding automobile brake. An object of the invention is to simplify the manufacture of brake shoes from sheet metal, by stamping out the major part of the shoe in one blank as two integrally-connected sections and then folding the sections upon each other, preferably about a straight line shown as extending radially at the cam end of the shoe, and securing them together.

In one desirable arrangement, the sections are mirror images of each other, each including one side of the cylindrical friction face and a flange forming half the stiffening web. I prefer to offset the flanges at one end of the shoe so that they project beyond the friction face as spaced anchoring arms.

Other features relate to a novel thrust member for the cam or other applying means, to a novel construction providing spaced bearings to be mounted on a pivot, and to other desirable arrangements and constructions of parts which will be apparent from one illustrative embodiment shown in the accompanying drawings, in which:

Figure 1 is a vertical section through a brake including the novel shoes, just inside the head of the brake drum, showing the shoes in side elevation;

Figure 2 is a section on the line 2—2 of Figure 1, showing the anchorage of the shoes;

Figure 3 is a section on the line 3—3 of Figure 1, showing a pivot connection between two of the shoes;

Figure 4 is a section through one shoe on the line 4—4 of Figure 1;

Figure 5 is a top plan view of the cam end of one shoe (without the lining), broken away to show the mounting of the cam thrust member;

Figure 6 is a side elevation of the shoe end shown in Figure 5;

Figure 7 is a plan view of the blank after stamping, and before the sections are folded together;

Figure 8 is a partial elevation, looking in the direction of the arrows 8—8 of Figure 7, showing the connected ends of the sections;

Figure 9 is a partial elevation of one end of one section, looking in the direction of the arrows 9—9 of Figure 7;

Figure 10 is a section through the blank on the line 10—10 of Figure 7;

Figure 11 is a section through the blank on the line 11—11 of Figure 7; and

Figure 12 is a view corresponding to Figure 5, but showing a modification with an integral cam plate.

The illustrated shoes are intended for use in a brake of the type shown in Figure 1, including a brake drum 10, at the open side of which there may be arranged a backing plate 12 or other suitable support, and within which are arranged three shoes 14, 16, and 18, shoes 14 and 18 preferably being identical and interchangeable.

Shoes 14 and 18 are forked at their lower ends, or otherwise provided with spaced arms straddling the opposite ends of shoe 16, and both of them may be connected to shoe 16 by suitable pivots 20 and 22. Shoe 16 is shown as being anchored on the backing plate 12 by means of a pivot 24 passing through relatively large openings 26 in the arms forming the end of shoe 14. The brake may be applied by suitable means such as a double cam 28, against the resistance of a return spring 30, the shoe 16 being applied through the shoes 14 and 18 (principally the latter) against the resistance of an auxiliary return spring 32, which urges one end of the pivot 22 against an eccentric adjustable stop 34 which is grooved or otherwise formed to interlock with the pivot.

The present invention relates to the manner of forming the shoes making up the brake. In a general way, each shoe is made up of two sections, each including a flange forming one-half of the stiffening web of the shoe and a cylindrical flange forming one-half of the friction face of the shoe, the two sections preferably being mirror images of each other (that is, the one is the reverse of the other) and which are integrally connected so that after they are stamped out they may be folded upon each other and secured together. I prefer to form the integral connection at the end of the shoe and in the case of the two end shoes 14 and 18 I prefer that the connection be at the cam end of the shoe so that the opposite ends of the two sections may be spread apart as will be apparent from inspection of Figures 2 and 3 to form the spaced arms straddling the end of shoe 16.

The blank for one of the end shoes 14 or 18 is shown in plan view in Figure 7 after it has been stamped out, but before the two sections have been folded upon each other. The blank includes two sections 36 and 38 integrally connected at 40 and each of which includes an outer cylindrical flange 42 forming one-half of the friction face of the finished shoe, and a flat or radial flange 44 forming one-half of the central stiffening web of the finished shoe, and preferably also a short reinforcing flange 46, on the inner edge of the stamping. As best appears in Figure 9, the flange 44 is offset at the end of each section so that when the two sections are folded upon each other they diverge from each other as appears in Figure 2, to form spaced anchoring arms. At each end of the stamping, that is, at the end of each of these arms, a tubular boss 46 is drawn out to form a bearing to receive one of the pivots 20 or 22 or 24. In the case of the two end shoes having spaced arms, I prefer to weld on the inner faces of these arms washers 48 cooperating with the bosses 46 to form spaced bearings for the pivots.

In constructing the shoe, the blank shown in Figure 7 is folded along the radial line 50 between the sections, to bring the sections back to back with the flanges 44 in engagement and with the flanges 42 extending in opposite directions to receive the brake lining 52 (Figure 4). The flanges 44 may be secured together by riveting or by spot-welding or in any other desired manner. Preferably the thrust member 54 is provided at the end of the shoe having rearwardly-projecting portions straddling and riveted to the integrally connected ends of the flanges 44. As shown in Figure 12, an integral cam-engaging thrust member 154 may be formed by folding the blank along two parallel spaced lines, in place of the separate thrust member 54.

The shoe 16 is formed in the same general manner as the shoes 14 and 18 except that it is not forked at either end and preferably the integrally connected ends of the stiffening flanges are at the anchor end, as will be apparent from comparison of Figures 1 and 2.

While particular shoes have been described in detail, it is not my intention to limit the scope of the invention to those particular shoes or otherwise than by the terms of the appended claims.

I claim:

1. A brake shoe formed of two integrally-connected sections, each containing one side of the cylindrical friction face and a stiffening flange and which are folded upon each other along a straight line and secured together.

2. A brake shoe formed of two integrally-connected sections folded upon each other along a straight line and secured together.

3. A brake shoe formed of two integrally-connected sections which are mirror images of each other and which are folded upon each other along a straight line and secured together.

4. A brake shoe formed of two integrally-connected sections folded upon each other along a straight line at one end of the shoe and secured together.

5. A brake shoe formed of two integrally-connected sections folded upon each other along a straight line extending substantially radially at one end of the shoe and secured together.

6. A brake shoe constructed and arranged to be pivoted at one end and formed of two sections integrally connected at the opposite end only.

7. A brake shoe constructed and arranged to be pivoted at one end and formed of two integrally-connected sections folded together along a straight line at the opposite end of the shoe.

8. A brake shoe constructed and arranged to be pivoted at one end and formed of two integrally-connected sections each including one side of the cylindrical friction face and which are folded together along a straight line at the opposite end of the shoe.

9. A brake shoe comprising two integrally-connected sections, each including one side of the cylindrical friction face and a stiffening flange extended as an anchoring arm at one end of the shoe, the sections being folded upon each other along a substantially straight line.

10. A brake shoe comprising two integrally-connected sections, each including one side of the cylindrical friction face and a stiffening flange extending as an anchoring arm at one end of the shoe, the sections being folded upon each other along a substantially straight line at the opposite end of the shoe.

11. A brake shoe comprising two integrally-connected sections, each including one side of the cylindrical friction face and a stiffening flange offset at one end from the central plane of the shoe and extended as an anchoring arm at that end of the shoe, the sections being folded upon each other along a substantially straight line.

12. A brake shoe comprising two integrally-connected sections, each including one side of the cylindrical friction face and a stiffening flange offset at one end from the central plane of the shoe and extended as an anchoring arm at that end of the shoe, the sections being folded upon each other along a substantially straight line, the two flanges being offset in such a manner that the anchoring arms are spaced apart at opposite sides of the shoe.

13. A brake shoe comprising two sections integrally connected along a substantially radial line at one end of the shoe, and a thrust member at that end of the shoe engaging both sections.

14. A brake shoe comprising two sections integrally connected along a substantially radial line at one end of the shoe, and a thrust member at that end of the shoe having parts straddling the connected ends of the two sections and secured thereto.

15. A brake shoe having a flange drawn out to form a laterally-extending tubular boss to be mounted on a pivot, with a washer secured to the opposite side of the flange over the base of said boss, the boss and washer forming spaced pivot bearings.

In testimony whereof, I have hereunto signed my name.

EUGENE G. McDONALD.